(12) United States Patent
Stack et al.

(10) Patent No.: US 11,213,989 B2
(45) Date of Patent: Jan. 4, 2022

(54) DOWNHOLE PROBE SLEEVES AND METHODS FOR MAKING PROBE SLEEVES

(71) Applicant: Evolution Engineering Inc., Calgary (CA)

(72) Inventors: Luke A. Stack, Calgary (CA); Aaron W. Logan, Calgary (CA); Justin C. Logan, Calgary (CA); Patrick R. Derkacz, Calgary (CA)

(73) Assignee: Evolution Engineering Inc., Calgary (CA)

( * ) Notice: Subject to any disclaimer, the term of this patent is extended or adjusted under 35 U.S.C. 154(b) by 261 days.

(21) Appl. No.: 16/473,226

(22) PCT Filed: Dec. 21, 2017

(86) PCT No.: PCT/CA2017/051574
§ 371 (c)(1),
(2) Date: Jun. 24, 2019

(87) PCT Pub. No.: WO2018/112647
PCT Pub. Date: Jun. 28, 2018

(65) Prior Publication Data
US 2019/0353027 A1 Nov. 21, 2019

Related U.S. Application Data (60) Provisional application No. 62/438,971, filed on Dec. 23, 2016.

(51) Int. Cl.
*B29C 48/09* (2019.01)
*B29C 48/88* (2019.01)
(Continued)

(52) U.S. Cl.
CPC .......... *B29C 48/09* (2019.02); *B29C 48/0018* (2019.02); *B29C 48/32* (2019.02);
(Continued)

(58) Field of Classification Search
CPC ..... B29C 48/0018; B29C 48/09; B29C 48/10; B29C 48/32; B29C 48/88; B29C 48/90;
(Continued)

(56) References Cited

U.S. PATENT DOCUMENTS 3,060,505 A * 10/1962 Brasie .................... B29C 48/87
425/467
3,146,495 A * 9/1964 Sanford .................. B29C 48/32
425/380
(Continued)

FOREIGN PATENT DOCUMENTS

WO 2014085894 A1 6/2014
WO 2014168605 A1 10/2014

*Primary Examiner* — Atul P. Khare
(74) *Attorney, Agent, or Firm* — Oyen Wiggs Green & Mutala LLP (57) ABSTRACT

A downhole probe of a drilling rig has a probe sleeve for protecting the downhole probe. The probe sleeve may be made of a metal or a polymer such as polyphenylene sulfide. The probe sleeve may be heat-shrinkable to provide a tight fit between the downhole probe and the probe sleeve. The probe sleeve may include one or more protrusions shaped to engage a centralizer surrounding at least part of the downhole probe. The one or more protrusions may be arranged to prevent rotation of the centralizer relative to the probe sleeve. The probe sleeve may be made using a modified extrusion process and may include reinforcement to add strength to weld-lines along the length of the probe sleeve. The protrusions may also be used as reinforcement.

11 Claims, 11 Drawing Sheets

(51) Int. Cl.
*E21B 47/01* (2012.01)
*E21B 17/00* (2006.01)
*E21B 17/10* (2006.01)
*E21B 47/13* (2012.01)
*B29C 61/02* (2006.01)
*B29C 48/32* (2019.01)
*B29C 48/00* (2019.01)

(52) U.S. Cl.
CPC ........ *B29C 48/9115* (2019.02); *B29C 61/025* (2013.01); *E21B 17/003* (2013.01); *E21B 17/1042* (2013.01); *E21B 47/01* (2013.01); *E21B 47/13* (2020.05); *Y10T 428/1328* (2015.01); *Y10T 428/1352* (2015.01)

(58) Field of Classification Search
CPC ... B29C 48/901; B29C 48/91; B29C 48/9115; B29C 48/912
See application file for complete search history.

(56) References Cited

U.S. PATENT DOCUMENTS

| | | | | |
|---|---|---|---|---|
| 3,912,240 | A * | 10/1975 | Smith | B29C 48/32 425/380 |
| 4,051,456 | A | 9/1977 | Heilhecker et al. | |
| 5,047,635 | A | 9/1991 | Leaney et al. | |
| 6,053,214 | A * | 4/2000 | Sjoberg | B29C 48/33 138/134 |
| 9,512,682 | B2 * | 12/2016 | Mueller | B21C 23/085 |
| 9,523,246 | B2 | 12/2016 | Logan et al. | |
| 2004/0262023 | A1 * | 12/2004 | Morrow | H02G 3/0481 174/481 |
| 2015/0367563 | A1 * | 12/2015 | Porter | B29C 48/908 138/141 |
| 2015/0369035 | A1 * | 12/2015 | Logan | E21B 17/1078 166/66 |
| 2016/0089846 | A1 | 3/2016 | Mccartney et al. | |

* cited by examiner

DOWNHOLE PROBE SLEEVES AND METHODS FOR MAKING PROBE SLEEVES

CROSS-REFERENCE TO RELATED APPLICATION

This application claims priority from U.S. Application No. 62/438,971 filed 23 Dec. 2016. For purposes of the United States, this application claims the benefit under 35 U.S.C. § 119 of U.S. Application No. 62/438,971 filed 23 Dec. 2016 and entitled DOWNHOLE PROBE SLEEVES AND METHODS FOR MAKING PROBE SLEEVES which is hereby incorporated herein by reference for all purposes.

TECHNICAL FIELD

This invention relates to subsurface drilling, particularly subsurface drilling involving the use of downhole probes. Some embodiments are applicable to directional drilling of wells for recovering hydrocarbons.

BACKGROUND

Recovering hydrocarbons from subterranean zones typically involves drilling wellbores. Wellbores are made using surface-located drilling equipment which drives a drill string that eventually extends from the surface equipment to the formation or subterranean zone of interest.

The drill string can extend thousands of feet or meters below the surface. The terminal end of the drill string includes a drill bit for drilling (or extending) the wellbore. Drilling fluid, usually in the form of a drilling "mud", is typically pumped through the drill string. The drilling fluid cools and lubricates the drill bit and also carries cuttings back to the surface. Drilling fluid may also be used to help control bottom hole pressure to inhibit hydrocarbon influx from the formation into the wellbore and potential blow out at surface.

Bottom hole assembly (BHA) is the name given to the equipment at the terminal end of a drill string. In addition to a drill bit, a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; one or more systems for telemetry of data to the surface; stabilizers; heavy weight drill collars; pulsers; and the like. The BHA is typically advanced into the wellbore by a string of metallic tubulars (drill pipe).

Modern drilling systems may include any of a wide range of mechanical/electronic systems in the BHA or at other downhole locations. Such electronics systems may be packaged as part of a downhole probe. A downhole probe may comprise any active mechanical, electronic, and/or electro-mechanical system that operates downhole. A probe may provide any of a wide range of functions including, without limitation: data acquisition; measuring properties of the surrounding geological formations (e.g. well logging); measuring downhole conditions as drilling progresses; controlling downhole equipment; monitoring status of downhole equipment; directional drilling applications; measuring while drilling (MWD) applications; logging while drilling (LWD) applications; measuring properties of downhole fluids; and the like. A probe may comprise one or more systems for: telemetry of data to the surface; collecting data by way of sensors (e.g. sensors for use in well logging) that may include one or more of vibration sensors, magnetometers, inclinometers, accelerometers, nuclear particle detectors, electromagnetic detectors, acoustic detectors, and others; acquiring images; measuring fluid flow; determining directions; emitting signals, particles or fields for detection by other devices; interfacing to other downhole equipment; sampling downhole fluids; etc. A downhole probe is typically supported in a bore of a drill string near the drill bit. Some downhole probes are highly specialized and expensive.

Downhole conditions can be harsh. A probe may experience high temperatures; vibrations (including axial, lateral, and torsional vibrations); shocks; immersion in drilling fluids; high pressures (20,000 p.s.i. or more in some cases); turbulence and pulsations in the flow of drilling fluid past the probe; fluid initiated harmonics; and torsional acceleration events from slip which can lead to side-to-side and/or torsional movement of the probe. These conditions can shorten the lifespan of downhole probes and can increase the probability that a downhole probe will fail in use. Replacing a downhole probe that fails while drilling can involve very great expense.

A downhole probe may communicate a wide range of information to the surface by telemetry. Telemetry information can be invaluable for efficient drilling operations. For example, telemetry information may be used by a drill rig crew to make decisions about controlling and steering the drill bit to optimize the drilling speed and trajectory based on numerous factors, including legal boundaries, locations of existing wells, formation properties, hydrocarbon size and location, etc. A crew may make intentional deviations from the planned path as necessary based on information gathered from downhole sensors and transmitted to the surface by telemetry during the drilling process. The ability to obtain and transmit reliable data from downhole locations allows for relatively more economical and more efficient drilling operations.

Telemetry techniques that may be used to carry information from a downhole probe to the surface include transmitting information by generating vibrations in fluid in the bore hole (e.g. acoustic telemetry or mud pulse (MP) telemetry) and transmitting information by way of electromagnetic signals that propagate at least in part through the earth (EM telemetry). Other telemetry techniques use hardwired drill pipe, fiber optic cable, or drill collar acoustic telemetry to carry data to the surface.

In directional drilling, information from a downhole probe can be essential to guiding the drilling to follow a desired trajectory. For example, the downhole probe may include sensors to detect inclination and heading of the drill string.

Downhole probes often have a probe housing for containing the electronics systems. In some circumstances, the downhole probe is provided within a centralizer which bears against the wall of the drill pipe/string, drill collar or gap sub and maintains a central orientation of the downhole probe. One example of a centralizer is provided in U.S. patent application Ser. No. 14/073,757.

The centralizer of U.S. patent application Ser. No. 14/073,757 comprises: an elongated tubular member having a wall formed to provide a cross-section that provides first outwardly-convex and inwardly-concave lobes. The first lobes are arranged to contact a bore wall of a bore in a section of a drill string at a plurality of spots spaced apart around a circumference of the bore wall. The centralizer also comprises a plurality of inwardly-projecting portions. Each of the plurality of inwardly-projecting portions is arranged between two adjacent ones of the plurality of first lobes.

Reliability is one problem encountered in drilling with downhole probes. As noted above, failure of a downhole probe can be very costly. It would be beneficial to be able to construct downhole probes in such a manner that the probes have enhanced reliability under downhole conditions.

SUMMARY

The invention has a number of different aspects. These include, without limitation:
- downhole probes comprising protective sleeves;
- heat-shrinkable probe sleeves;
- probe sleeves which are configured with projections to prevent rotation of centralizers relative to the probe sleeves;
- extruded probe sleeves with reinforced weld-lines;
- methods for manufacturing heat-shrinkable probe sleeves;
- methods for manufacturing probe sleeves which prevent rotation of centralizers relative to the probe sleeves;
- methods for manufacturing extruded probe sleeves with reinforced weld-lines;
- methods for installing heat-shrinkable probe sleeves;
- methods for installing probe sleeves which prevent rotation of centralizers relative to the probe sleeves; and
- methods for installing extruded probe sleeves with reinforced weld-lines.

One example aspect provides a probe sleeve for use in subsurface drilling. The probe sleeve comprises a thin-walled protective tube for covering a probe housing. In some embodiments, the tube is cylindrical in shape. In some embodiments, the probe sleeve is heat-shrinkable to provide a tight fit around a corresponding probe housing. In some embodiments, the tube is made of a suitable plastic or metal material. In a particular embodiment, the tube is made of a thermoplastic such as polyphenylene sulfide.

Another example aspect of the invention provides a probe sleeve having one or more external protrusions for engaging a centralizer. The protrusions may engage the centralizer in such a way as to prevent rotation of the centralizer relative to the probe sleeve. In some embodiments, the protrusions are located to cover one or more weld-lines on the probe sleeve and serve to reinforce the probe sleeve. In some embodiments, the protrusions prevent rotation in one direction, while in other embodiments, the protrusions prevent rotation in both directions.

Another example aspect of the invention provides probe sleeves with reinforced weld-lines. Additional material may be added to reinforce weld-lines during the extrusion process or after by way of bonding.

Another example aspect of the invention provides a method for manufacturing heat-shrinkable probe sleeves. The method comprises pushing or drawing a heated polymer through a spider die and cooling the polymer before internal stresses within the polymer have time to relax. The method may further comprise adding reinforcing material along or around weld-lines in the polymer. In some embodiments, the reinforcing material may be added in a way that provides one or more protrusions for engaging a centralizer and preventing rotation of the centralizer relative to the probe sleeve.

Another example aspect of the invention provides a method of manufacturing heat shrinkable probe sleeves comprising pushing or pulling a mandrel through a plastic sleeve to expand the plastic sleeve radially, placing the sleeve over a probe housing, and heating the sleeve thereby causing the sleeve to shrink to fit the probe housing. In some embodiments, the plastic sleeve is preheated before the mandrel is pushed or pulled therethrough and then cooled before the sleeve is placed over the probe housing.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Unless context dictates otherwise, the term "laminar flow state" means the state where fluid flows without significant turbulence e.g. in substantially parallel layers, with substantially no disruption between the layers.

Figure 1:
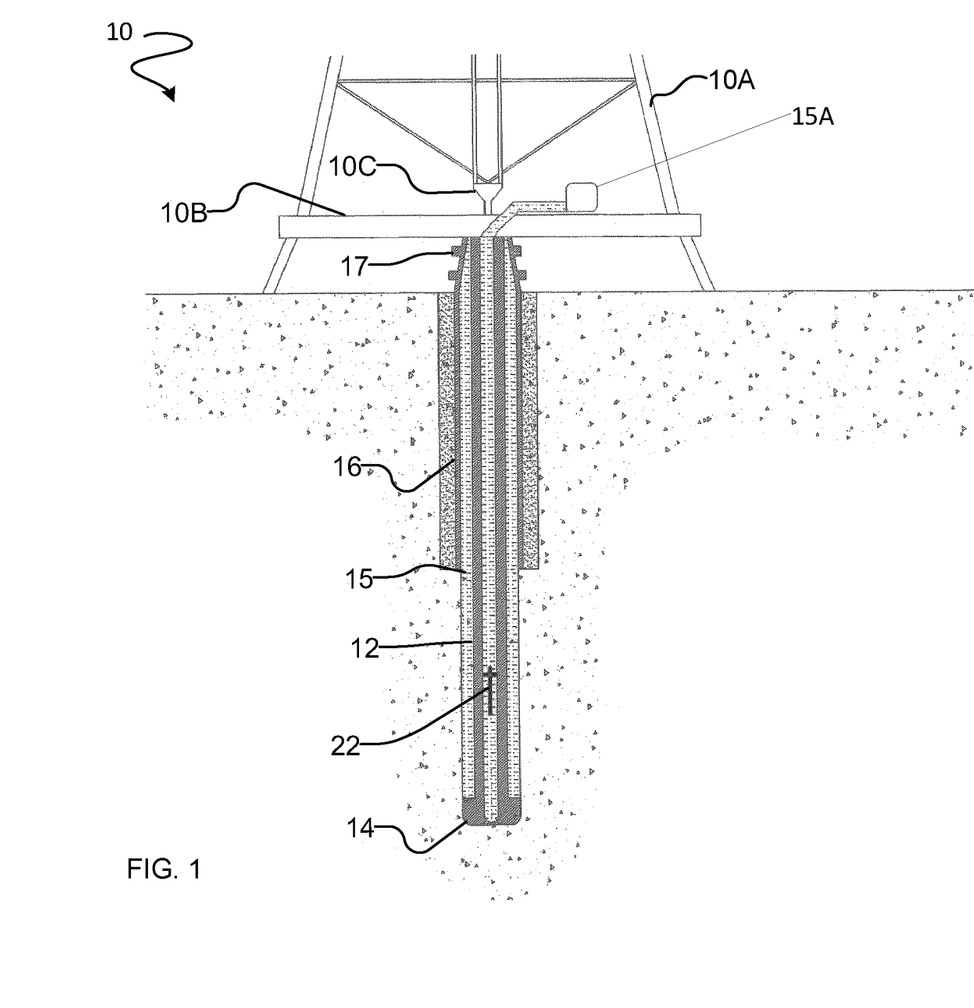
FIG. 1 is a schematic view of an exemplary drilling operation.

FIG. 1 shows schematically an example drilling operation. A drill rig 10 drives a drill string 12 which includes sections of drill pipe that extend to a drill bit 14. The illustrated drill rig 10 includes a derrick 10A, a rig floor 10B and draw works 10C for supporting the drill string. Drill bit 14 is larger in diameter than the drill string above the drill bit. An annular region 15 surrounding the drill string is typically filled with drilling fluid. The drilling fluid is pumped through a bore in the drill string to the drill bit and returns to the surface through annular region 15 carrying cuttings from the drilling operation. As the well is drilled, a casing 16 may be made in the well bore. A blow out preventer 17 is supported at a top end of the casing. The drill rig illustrated in FIG. 1 is an example only. The methods and apparatus described herein are not specific to any particular type of drill rig.

Drill string 12 includes a downhole probe. Here the term 'probe' encompasses any active mechanical, electronic, and/or electromechanical system. A probe may provide any of a wide range of functions including, without limitation, data acquisition, sensing, data telemetry, control of downhole equipment, status monitoring for downhole equipment, collecting data by way of sensors that may include one or more of vibration sensors, magnetometers, nuclear particle detectors, electromagnetic detectors, acoustic detectors, and others, emitting signals, particles or fields for detection by other devices, etc. Some downhole probes are highly specialized and expensive. Downhole conditions can be harsh. Exposure to these harsh conditions, which can include high temperatures, exposure to fast-flowing drilling fluid which may contain abrasive particles, vibrations, shocks, and immersion in various drilling fluids can shorten the lifespan of downhole probes.

The following description describes an electronics package 22 which is one example of a downhole probe. However, the probe is not limited to electronics packages and, in some embodiments, could comprise mechanical or other non-electronic systems. Electronics package 22 comprises a housing enclosing electric circuits and components providing desired functions.

Electronics package 22 typically has an elongated cylindrical body. The body may, for example, comprise probe housing 21. Probe housing 21 may be a metal tube designed to withstand downhole conditions. The body may, for example, have a length in the range of 1 to 20 meters.

Figure 2:
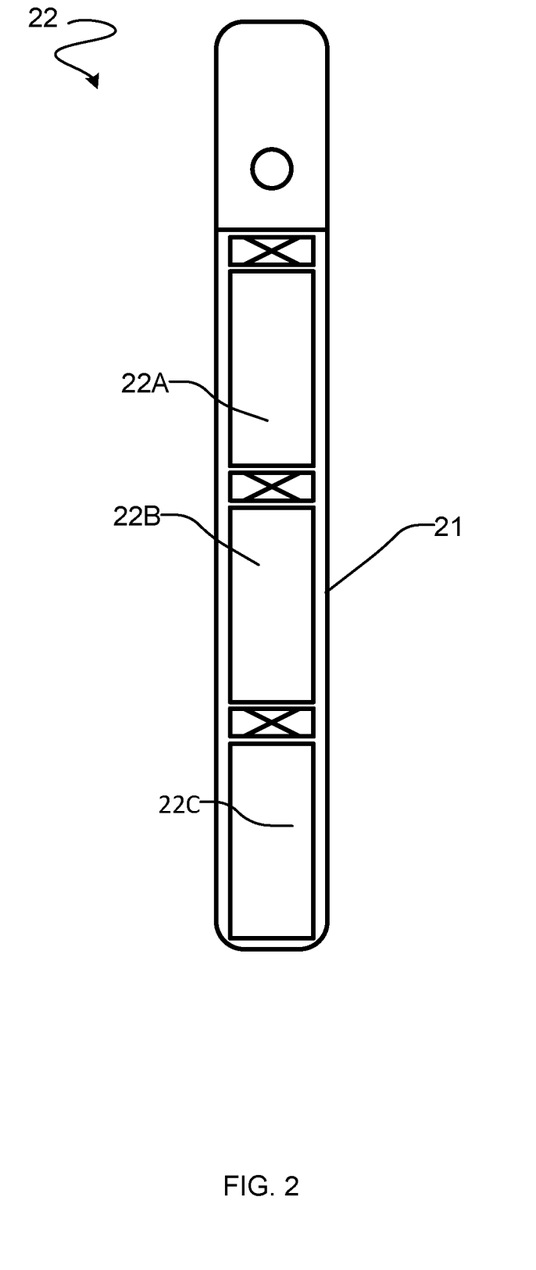
FIG. 2 is a schematic view of an exemplary downhole probe.

FIG. 2 depicts an example electronics package 22. Electronics package 22 comprises probe housing 21. Within probe housing 21 are active components such as suitable sensors, electronic circuits, batteries and the like that provide desired functionality. In the illustrated embodiment the active components are divided into three modules, 22A, 22B and 22C. Other embodiments could have more or fewer modules.

Downhole electronics package 22 may optionally include a telemetry system for communicating information to the surface in any suitable manner. In some example embodiments a telemetry system is an electromagnetic (EM) telemetry system however other modes of telemetry may be provided instead of or in addition.

Figure 3:
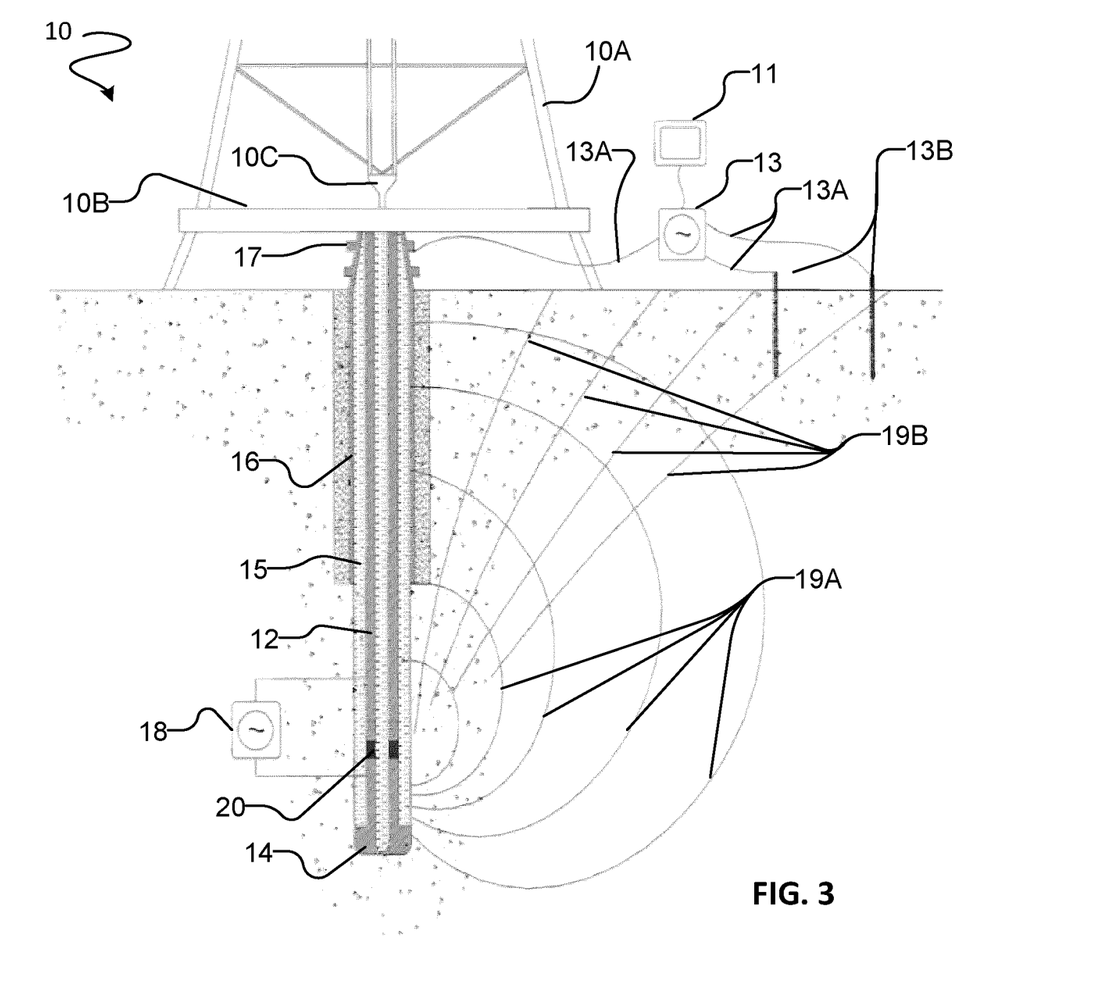
FIG. 3 is a schematic view of an exemplary telemetry system used in a drilling operation.

FIG. 3 shows an example EM telemetry system, where electronics package 22 comprises an EM telemetry signal generator 18 that is electrically connected across the electrically-insulating gap of a gap sub 20. The signals from the EM signal generator result in electrical currents 19A and electric fields 19B that are detectable at the surface. In the illustrated embodiment a signal receiver 13 is connected by signal cables 13A to measure potential differences between electrical grounding stakes 13B and the top end of drill string 12. A display 11 may be connected to display data received by the signal receiver 13.

Figure 4:
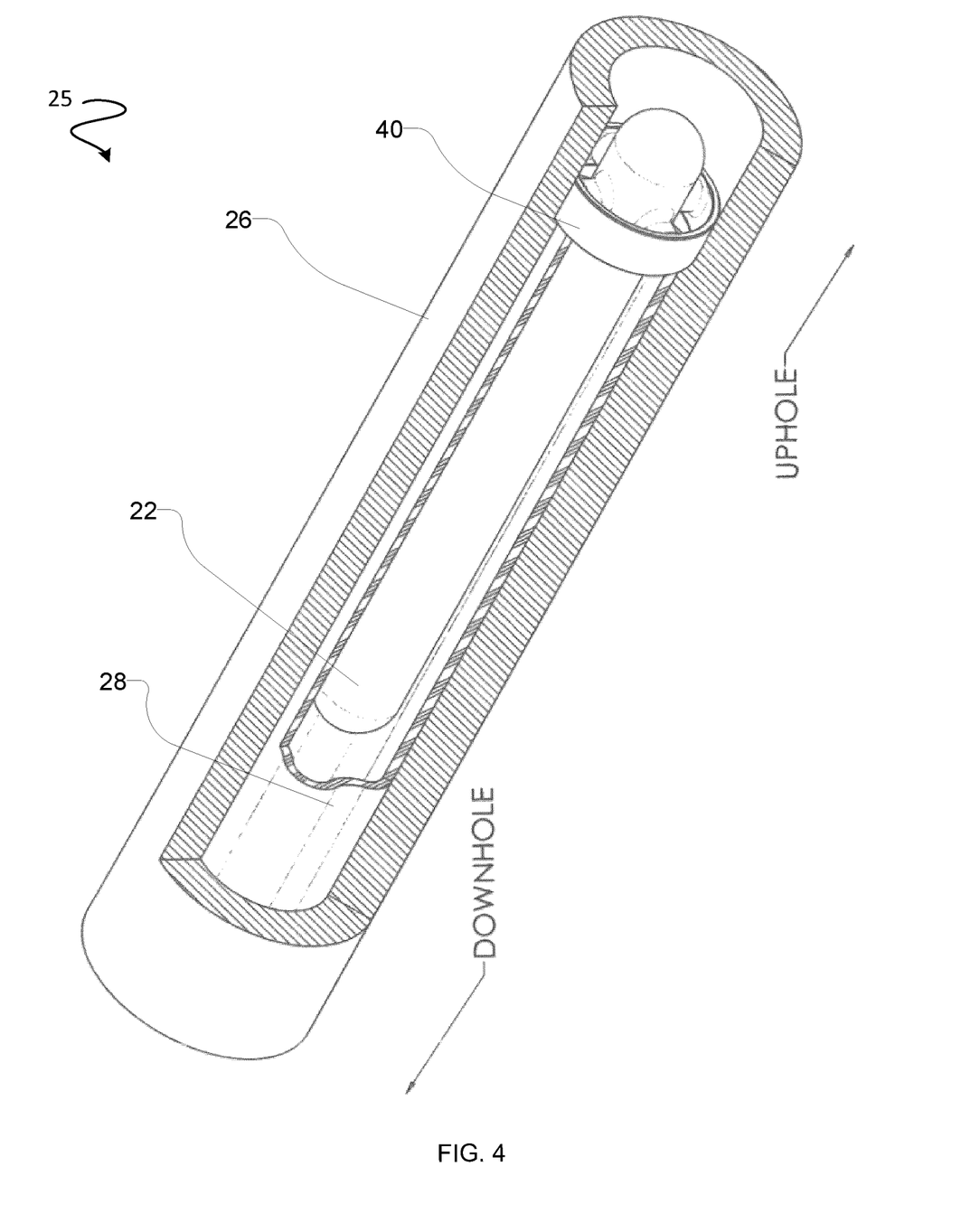
FIG. 4 is a schematic partial cross-section of an exemplary downhole assembly.
Figure 5:
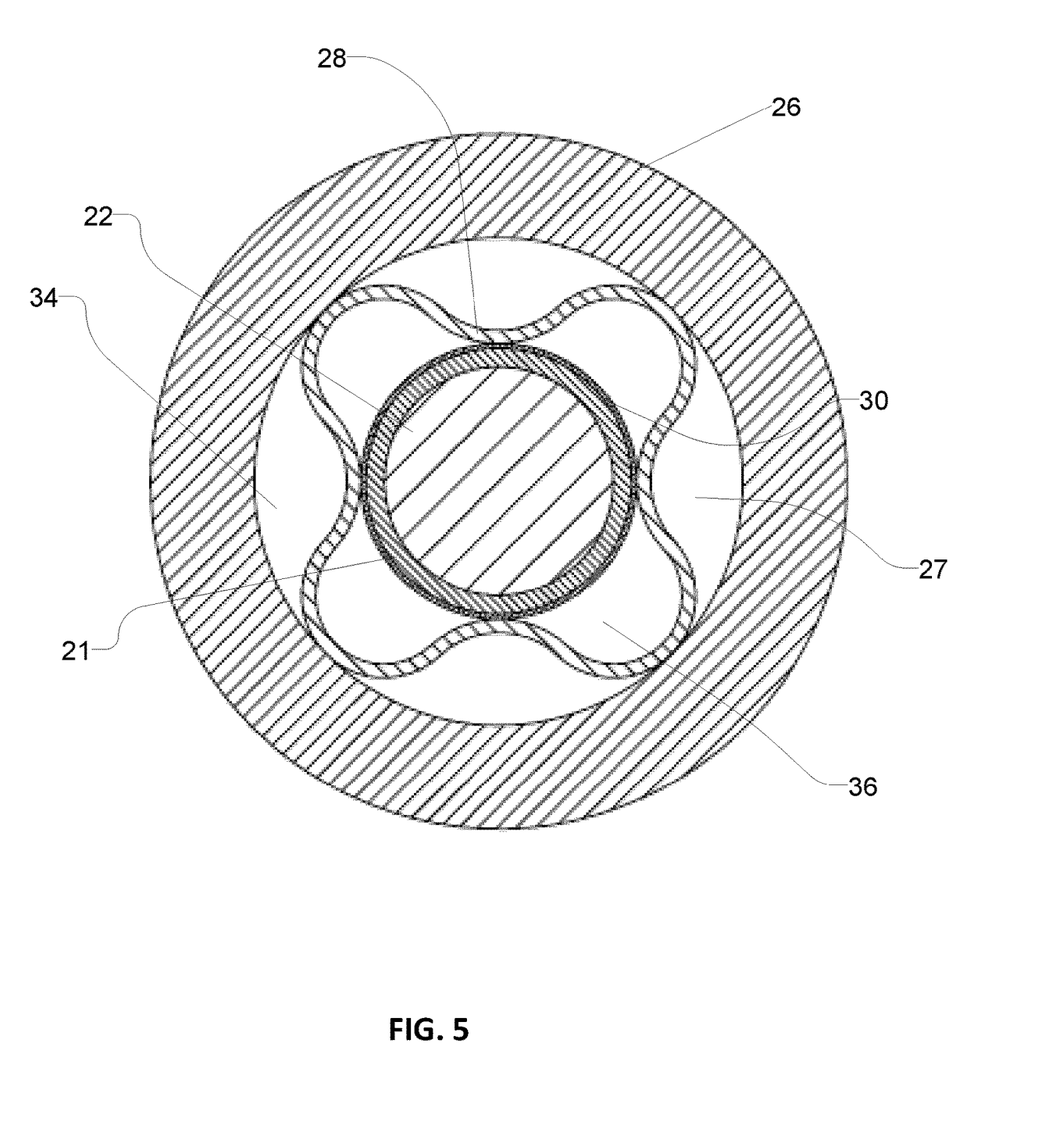
FIG. 5 is a schematic cross-section of an exemplary downhole probe installation.

FIGS. 4 and 5 show a downhole assembly 25 comprising an electronics package 22 supported within a bore 27 in a section 26 of drill string. Section 26 may, for example, comprise a drill collar, a gap sub or the like. Electronics package 22 is smaller in diameter than bore 27. Electronics package is centralized within bore 27 by a tubular centralizer 28.

Figure 6:
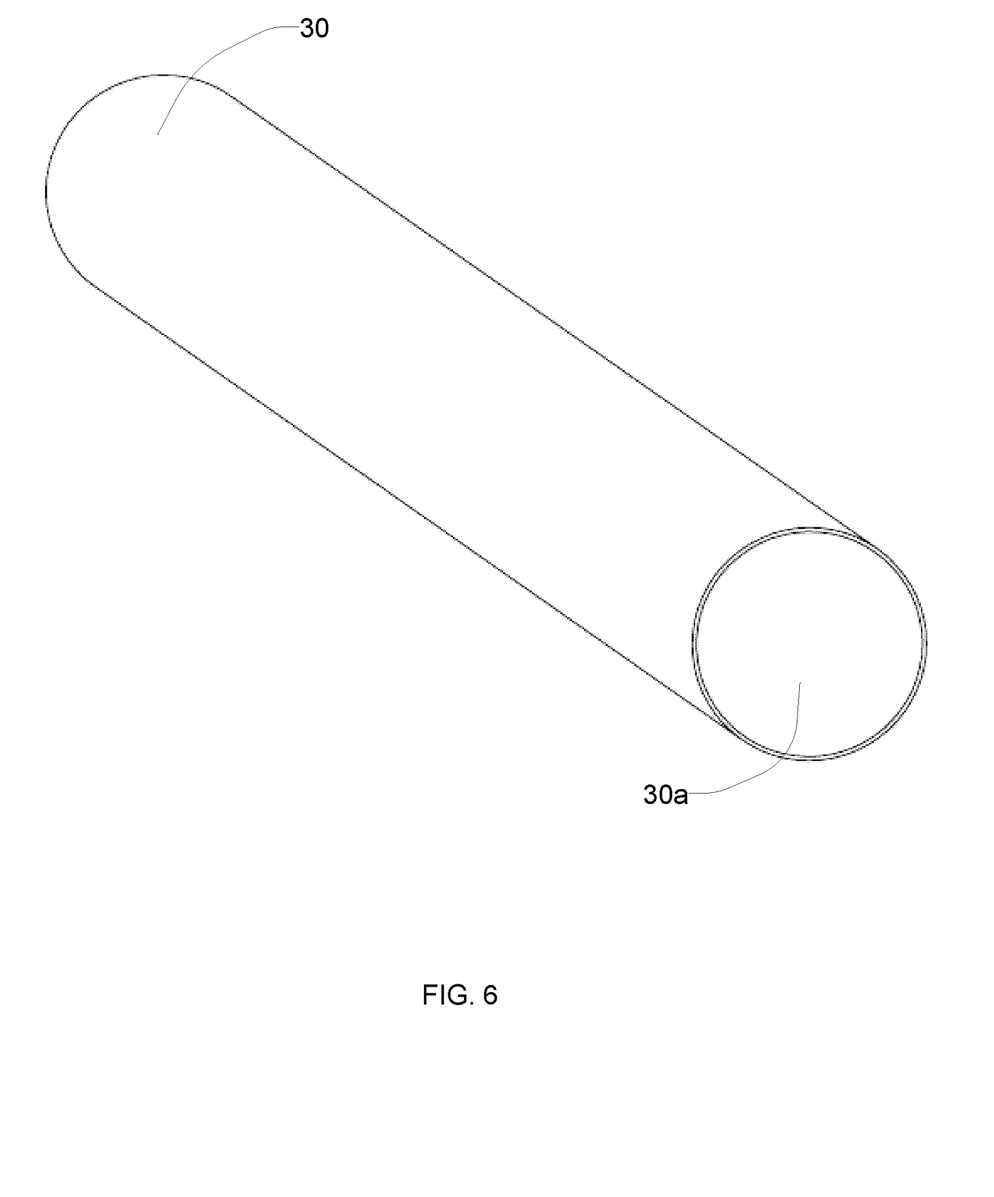
FIG. 6 is a schematic view of an exemplary probe sleeve.

One aspect of this invention provides a probe sleeve 30 for installing over probe housing 21. Probe sleeve 30 may provide an inexpensive, replaceable protective cover for probe housing 21. Probe sleeve 30 may be of any shape having an internal bore 30a for tightly receiving probe housing 21. As depicted in FIG. 6, probe sleeve 30 may be generally cylindrical in shape so as to mate with cylindrical probe housing 21. In general, internal bore 30a is shaped to tightly fit around probe housing 21 so as not to allow fluid to flow between probe sleeve 30 and probe housing 21. As such, internal bore 30a may be of any shape to correspond with a particular shape of probe housing. The outer surface of probe sleeve 30 may be circular in cross-section or may take another shape as discussed further below.

Since probe sleeve 30 may cooperate with drilling fluid within bore 27 to dampen undesired motions of electronics package 22, probe sleeve 30 may be designed with reference to the type of fluid that will be used in drilling. For air drilling, probe sleeve 30 may be made with thicker walls and/or made of a stiffer material so that it can help, in conjunction with a suitable centralizer in some cases, to hold electronics package 22 against motions in the absence of an incompressible drilling fluid. Conversely, the presence of drilling fluid in channels 34 and 36 tends to dampen high-frequency vibrations and to cushion transverse motions of electronics package 22. Consequently, a probe sleeve 30 for use with drilling fluids may have thinner walls than a probe sleeve 30 designed for use while air drilling. In an example embodiment, the wall of probe sleeve 30 has a thickness in the range of 0.02 to 0.25 inches (0.5 to 6.5 mm).

In a more specific example embodiment, the wall of probe sleeve 30 is made of a thermoplastic material (e.g. PET, PPS or PEEK) and has a thickness of about 0.05 inches (approximately 1.25 mm). In other embodiments, the wall of probe sleeve 30 is a reinforced polymer such as, for example, glass fiber reinforced polymer. The thickness of probe sleeve 30 may be consistent throughout or may vary according to the shape of probe sleeve 30 or probe housing 21.

In some embodiments, the probe includes one or more electrodes located in a portion of the probe covered by the probe sleeve and the apertures that align with the one or more electrodes. The electrodes may be connected, for example, to a telemetry transmitter and/or a telemetry receiver and/or one or more sensing circuits. The electrodes may have application for one or more of transmitting EM telemetry signals, receiving EM telemetry signals, resistivity measurements, etc.

In some embodiments, one or more electrodes extend around the circumference of a probe and separate sections of probe sleeve 30 cover the outside of the probe on opposing sides of the electrodes while leaving the electrodes exposed.

In some embodiments, probe sleeve 30 extends from a spider 40 or other longitudinal support system for electronics package 22 continuously to the opposing end of electronics package 22. In other embodiments one or more sections of probe sleeve 30 extend to cover electronics package 22 over at least 70% or at least 80% or at least 90% or at least 95% of a distance from the longitudinal support to the opposing end of electronics package 22. Accordingly, in some embodiments, probe sleeve 30 is in the range of 1 to 20 meters in length.

Figure 7A:
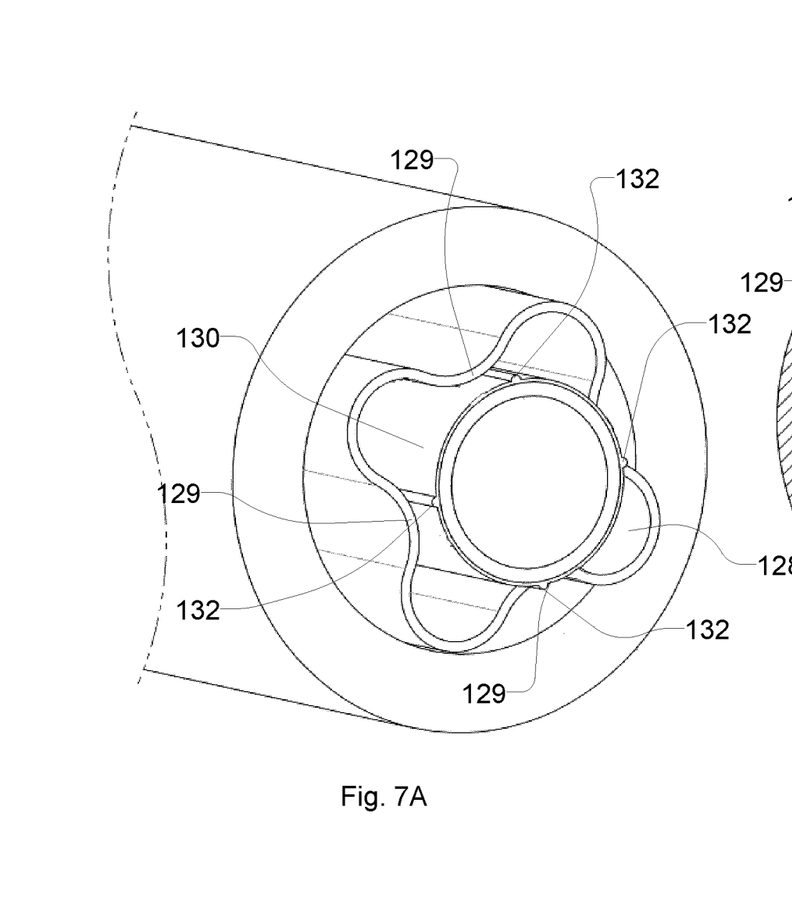
FIGS. 7A and 7B are schematic views of another exemplary probe sleeve and an exemplary centralizer.
Figure 7B:
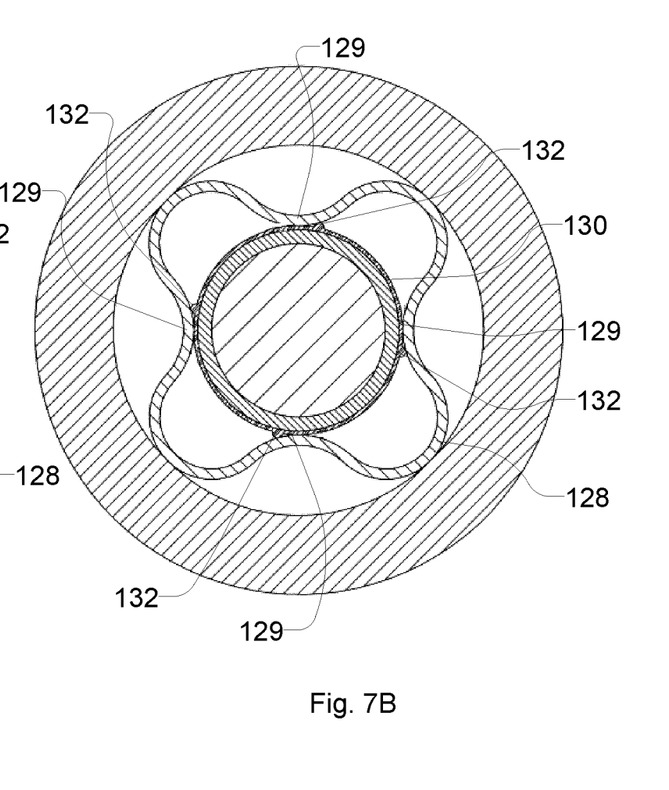

Another aspect of this invention provides a probe sleeve having external bumps or protrusions. The protrusions may prevent rotation of a centralizer relative to the probe sleeve (e.g. due to rotational fluid flow) so as to minimize premature wearing out of the probe sleeve and/or the centralizer. FIGS. 7A and 7B depict a probe sleeve 130 according to an example embodiment. Probe sleeve 130 has four protrusions 132 equally spaced around the outside of probe sleeve 130. Each of protrusions 132 extends along the entire length of probe sleeve 130. Protrusions 132 have the form of ridges in this embodiment. Probe sleeve 130 may be similar to probe sleeve 30 in all other ways.

Various numbers of protrusions may be provided on probe sleeve 130. In some embodiments, one protrusion 132 may be provided while in other embodiments, two or more protrusions 132 are provided. The number of protrusions 132 may be selected in relation to centralizer 128. For example, in the case of centralizer 128, as depicted in FIGS. 7A and 7B, centralizer 128 has four contact points 129 and probe sleeve 130 has four protrusions 132 that engage the four contact points 129. In other embodiments, a centralizer may have more or less contact points and may be matched with a probe sleeve having more or less protrusions. In some embodiments, the centralizer may have more or fewer contact points than the probe sleeve has protrusions.

Protrusions 132 may have various shapes. In some embodiments, protrusions 132 may be rounded in cross-section, as depicted in FIGS. 7A and 7B. In other embodiments, protrusions may be square or of another shape in cross-section. It may be beneficial for protrusions 132 to be rounded such that they do not meet the outer perimeter of probe sleeve 130 at a sharp angle since sharp angles tend to create increased internal stresses in the polymer and increased wear on probe sleeve 130 and/or centralizer 128.

Protrusions 132 may be designed to have any convenient length. In some embodiments, such as in FIGS. 7A and 7B, protrusions 132 extend along the entire length of probe sleeve 130. In other embodiments, protrusions 132 may only extend over a part of the length of probe sleeve 130. In other embodiments, protrusions 132 may comprise a series of small protrusions along the length of or part of the length of probe sleeve 130.

Figure 8A:
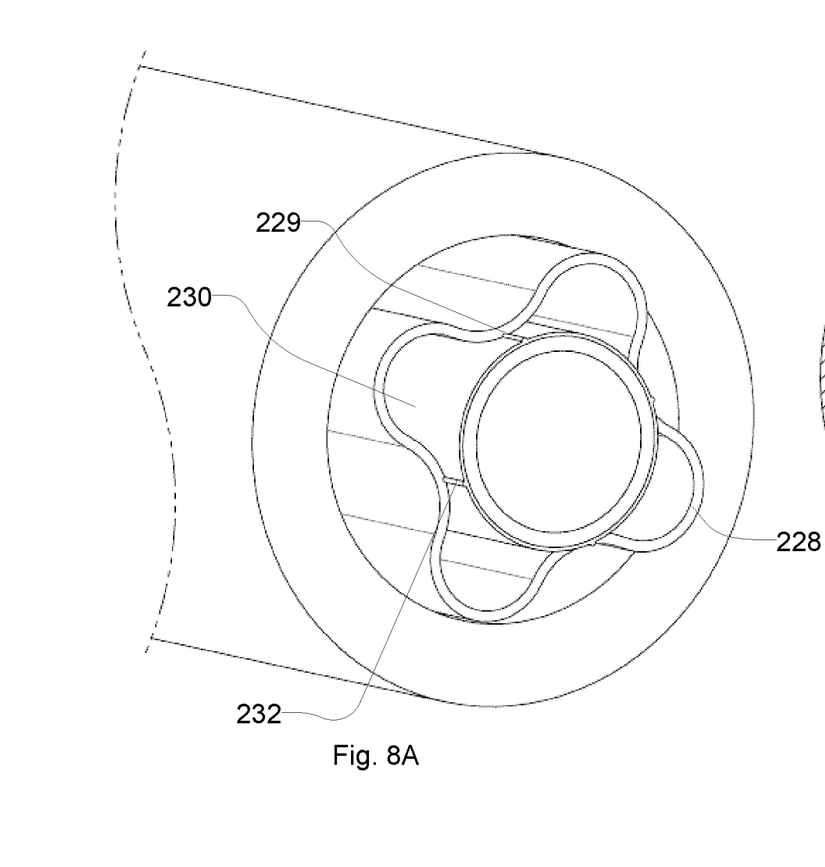
FIGS. 8A and 8B are schematic views of another exemplary probe sleeve and an another exemplary centralizer.
Figure 8B:
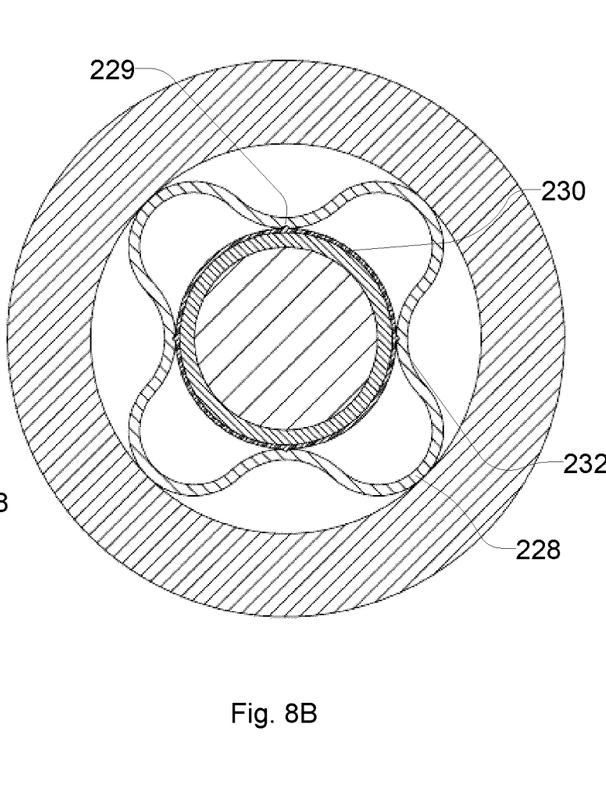

The circumferential spacing of protrusions 132 may be fixed. Protrusions 132 may be located so as to contact centralizer 128 at one or more locations, thereby arresting any of centralizer 128 relative to probe sleeve 130. In some embodiments, this means that protrusions 132 may be spaced evenly around the exterior of probe sleeve 130 such as depicted in FIGS. 7A and 7B while in other embodiments, the spacing may not be even. In some embodiments, a centralizer may have a corresponding protrusion, contact point or other feature for receiving one or more protrusions 132. In other embodiments, protrusions 132 engage centralizer 128 in a different way. For example, FIGS. 8A and 8B depicts a probe sleeve 230 having a plurality of protrusions 232 and a centralizer 228 having a plurality of notches 229 therein for receiving each of the protrusions 232 and thereby stopping rotation of probe sleeve 230 relative to centralizer 228. Probe sleeve 230 and centralizer 228 may be similar to probe sleeve 130 and centralizer 128 in all other ways.

Figure 9A:
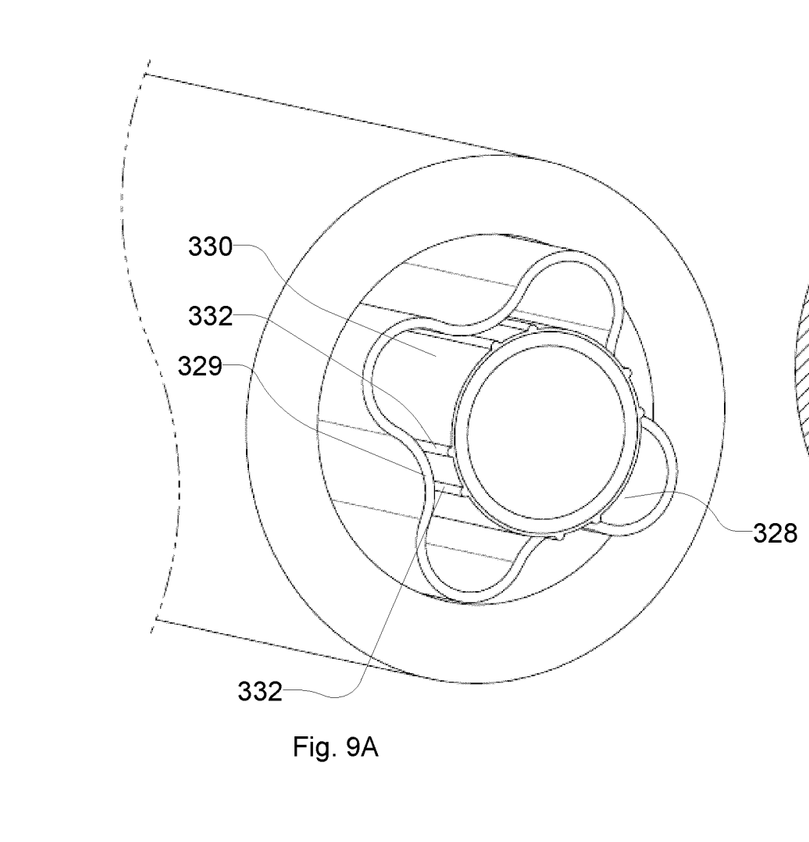
FIGS. 9A and 9B are schematic views of another exemplary probe sleeve and an another exemplary centralizer.
Figure 9B:
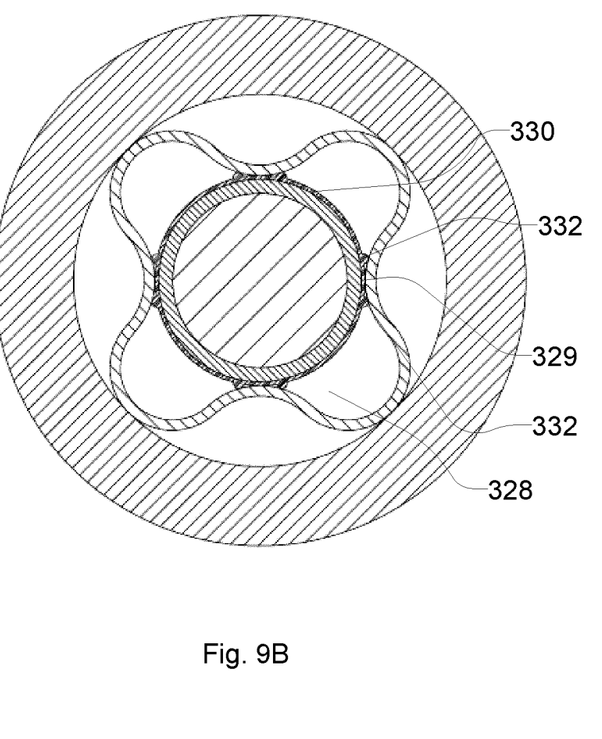

FIGS. 7A and 7B illustrate one embodiment in which each of protrusions 132 is initially located adjacent a contact point 129 so as to initially prevent rotation of probe sleeve 130 relative to centralizer 128 in a counter-clockwise direction while allowing minimal rotation in a clockwise direction. Due to the rotating nature of the drilling process (e.g. the swirling of drilling fluid) it may only be necessary to prevent rotation of probe sleeve 130 in one direction. However, in other embodiments, it may be beneficial to substantially arrest rotation in both directions. For example, FIGS. 9A and 9B depict a probe sleeve 330 having protrusions located on each side of one or more of contact points 329 of centralizer 328 to further minimize rotational movement in both directions as compared to the probe sleeve 130. Probe sleeve 330 and centralizer 328 may be similar to probe sleeve 130 and centralizer 128 in all other ways.

It may be beneficial to locate protrusions 132 along weld-lines in probe sleeve 130, although protrusions can be located along any part of probe sleeve 130. By locating protrusions 132 along weld-lines, the additional material of protrusions 132 may reinforce the weld-lines which may be weaker than other parts of probe sleeve 130 as is further discussed below.

In some embodiments, protrusions 132 may be added to probe sleeve 130 after extrusion while in other embodiments, protrusions 132 are extruded with probe sleeve 130. Protrusions 132 may be added after extrusion by way of bonding or welding, for example.

Probe sleeve 30 may be made from a range of materials including metals and plastics suitable for exposure to downhole conditions. Some non-limiting examples are suitable thermoplastics, elastomeric polymers, rubber, copper or copper alloy, alloy steel, and aluminum. For example probe sleeve 30 may be made from a suitable grade of PEEK (Polyetheretherketone), PET (Polyethylene terephthalate) or PPS (Polyphenylene sulfide) plastic. Where probe sleeve 30 is made of plastic, the plastic may be reinforced or fiber-filled (e.g. with glass fibers) for enhanced structural stability and strength.

The material of probe sleeve 30 should be capable of withstanding downhole conditions without degradation. The ideal material can withstand temperatures of up to at least 150° C. (preferably 175° C. or 200° C. or more), is chemically resistant or inert to any drilling fluid to which it will be exposed, does not absorb fluid to any significant degree and resists erosion by drilling fluid. The material characteristics of probe sleeve 30 may be uniform, but this is not necessary.

In some applications it is advantageous for the material of probe sleeve 30 to be electrically insulating. For example, where electronics package 22 comprises an EM telemetry system, providing an electrically-insulating probe sleeve 30 can prevent the possibility of short circuits between section 26 and the outside of electronics package 22 as well as increase the impedance of current paths through drilling fluid between electronics package 22 and section 26. Probe sleeve 30 may also function to increase impedance across the gap.

Probe sleeve 30 is preferably sized to snuggly grip electronics package 22. In some embodiments, insertion of probe housing 21 into probe sleeve 30 resiliently deforms the material of probe sleeve 30 such that probe sleeve 30 grips the outside of probe housing 21 firmly. In some embodiments, probe sleeve 30 is made of a heat-shrinkable material. In some embodiments, initially, the external diameter of probe housing 21 may be somewhat smaller in diameter than the internal diameter of probe sleeve 30 to allow for installation of probe sleeve 30. After heat shrinking, the internal diameter of probe sleeve 30 may be substantially equal to the external diameter of probe housing 21.

In some embodiments, probe sleeve 30 may be shrunk onto probe housing 21 to obtain a tight fit between probe sleeve 30 and probe housing 21. In particular embodiments, heat-shrinking may be employed to obtain a tight fit between probe sleeve 30 and probe housing 21. To obtain a more secure fit between probe sleeve 30 and probe housing 21, the surface of probe housing 21 may be sandblasted, knurled, engraved or altered in some other way to better grip probe sleeve 30. In some embodiments, additional securing means (e.g. adhesives, hose clamps or metal binding) may also be used to secure probe sleeve 30 to probe housing 21.

Another aspect of this invention provides a method for manufacturing heat-shrinkable probe sleeves 30. Heat-shrinkable probe sleeves 30 may be made from any suitable polymer. As a particular example, heat-shrinkable probe sleeves 30 may be made from PPS plastic. Heat-shrinkable probe sleeves 30 may be manufactured by an optimized extrusion process, as described below.

Similar to traditional extruding processes, the optimized extruding process may comprise pushing or drawing a heated polymer material, the polymer melt stream, through a die to form heat-shrinkable probe sleeves 30. Internal cavity 30a of probe sleeve 30 may be formed using a spider die, as depicted in FIGS. 10A and 10B.

Figure 10A:
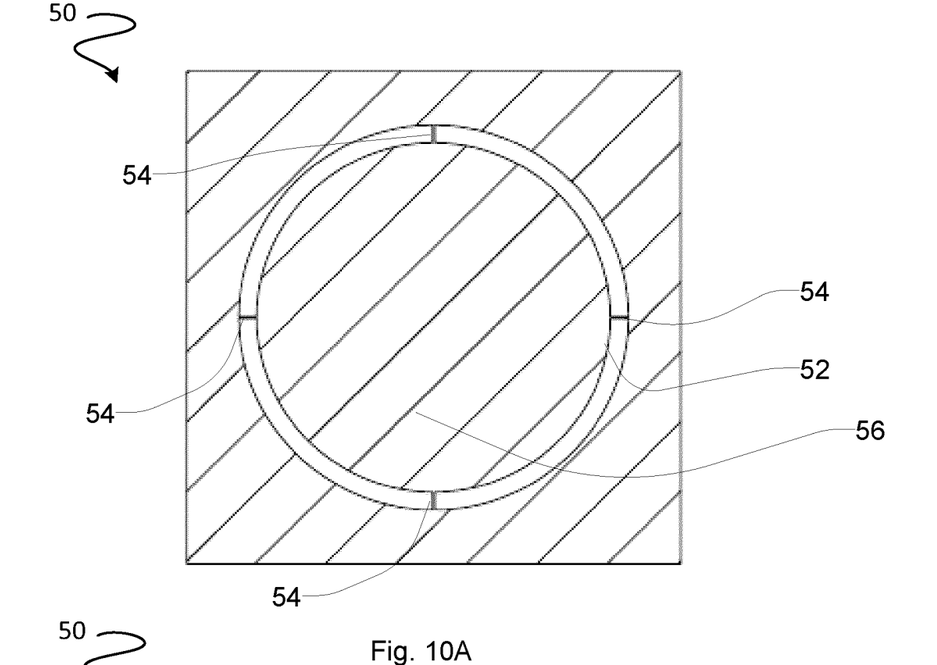
FIGS. 10A and 10B are schematic views of exemplary probe sleeve dies.
Figure 10B:
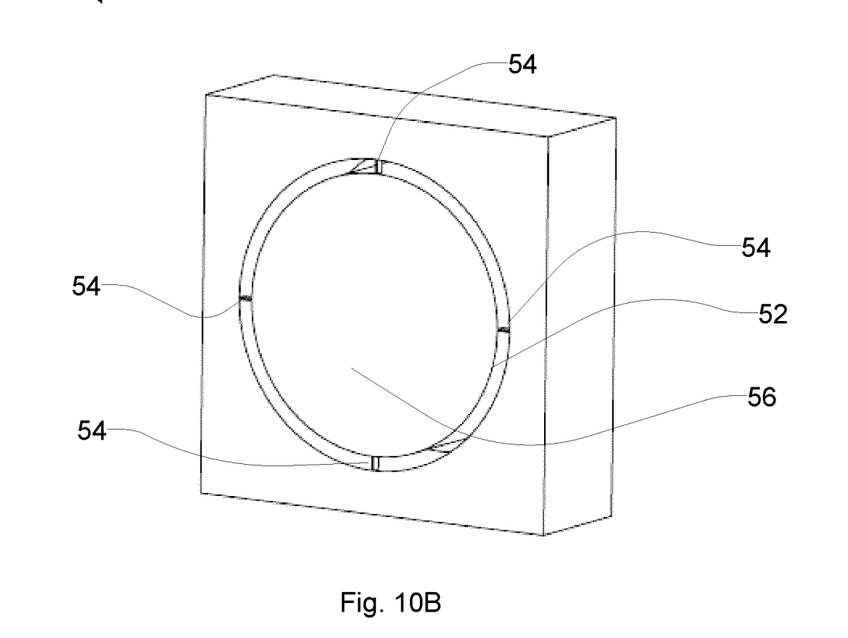

Spider die 50, as depicted in FIGS. 10A and 10B, comprises an opening 52, a mandrel 56 and spider legs 54 which connect the perimeter of mandrel 56 to the perimeter of opening 52. Spider die 50 may have different shapes depending on the desired shape of probe sleeve 30. In some embodiments, opening 52 is generally circular in shape for producing cylindrical probe sleeves 30. In other embodiments, the perimeter of opening 52 may be of one shape while the perimeter of mandrel 56 is of another shape so as to create probe sleeves 30 having various internal and external cross-sections.

Because of the presence of spider legs 54, the polymer melt stream is separated when it flows through spider die 50. The polymer melt stream reconnects, or knits back together after passing through spider die 50. In some embodiments, spider legs 54 do not extend through the whole depth of spider die 50, thereby allowing the polymer melt stream to reconnect before exiting through the back end of spider die 50. The seams where the material knits back together are commonly known as and may also be referred to herein as spider-lines, weld-lines, or knit-lines.

Weld-lines can affect the structural characteristics of a finished extruded product. In particular, weld-lines may result not only in variations in the thickness of probe sleeve 30 but also in a region of reduced mechanical properties in the extruded probe sleeve 30. Generally, the mechanical strength in weld-lines is significantly lower than that of the bulk materials. This may be explained by (i) insufficient entanglement of the molecular chains; (ii) unfavorable molecular orientation; and (iii) residual stresses in the area of weld-lines. In polymer melts, it is possible for the long chain molecules to coil, uncoil, align along streamlines, entangle or disentangle. In the absence of stress, the chains take up a randomly coiled or convoluted configuration. When stress is applied, deformation of a molecule can take place through a process of either bond stretching and bond angle opening, or rotation of segments of chain about the chain backbone. When the applied stress is removed, time is required for the molecular chains to recover their coiled shape because of the viscoelastic nature of the polymer melt. This time is denoted as relaxation time. Relaxation occurs at temperatures near to or above the melting temperature of the polymer. Complete relaxation is characterized by a state of equilibrium reached after a relaxation of a polymer begins.

In some embodiments, after being extruded, probe sleeve 30 is cooled to a temperature below a melting temperature of the polymer before it is installed on probe housing 21. When probe sleeve 30 is cooled, the residual stress that is induced may be less than that required to cause crazing. After installation around probe housing 21, probe sleeve 30 may be heated to a temperature that promotes relaxation of the polymer chains. As relaxation of the polymer occurs and the polymer chain molecules recover their coiled shape, the affected material will shrink. In some cases, shrinking of the material in and around the weld-lines may lead to undesired warping. However, by optimizing the number and placement of weld lines and controlling the warping, it is possible to ensure that the geometry of probe sleeves 30 is maintained and that warping is seen only as shrinking. In some embodiments, this may not be necessary as probe sleeve 30 will conform to probe housing 21 when heat-shrunk. In this way, it is possible to heat-shrink probe sleeve 30 to obtain a tight fit around probe housing 21.

By appropriate selection of the number and placement of weld lines and managing imparted stress, it is possible to use conventional polymers not normally used in heat-shrink applications (such as polyphenylene sulfide (PPS), polyethylene terephthalate (PET) or polyether ether ketone (PEEK)) as well as materials more commonly used in heat-shrink applications (such as polyolefin, fluoropolymer, polyvinylchloride (PVC), neoprene, silicone, or Viton™) to make a probe sleeve 30 that may be fit by heat shrinking to obtain a tight fit around probe housing 21. Such sleeves may be made without the use of additives and crosslinking and/or radiation to make them shrink when heated.

Typically, extruded probe sleeves are allowed to relax after passing through a die in order to improve their mechanical characteristics, particularly in regions near the weld-lines. Often, in order to maintain the shape of the extruded probe sleeve, the extruded probe sleeve is kept within a mold or a part of the die during relaxation. To create heat-shrinkable probe sleeves, the extruded probe sleeve may optionally be stretched before being installed and heat-shrunk. A sleeve that has been stretched before being heat shrunk onto a probe may fit more tightly to the probe after heat shrinking than a similar sleeve that has not been stretched. In contrast, in some embodiments of this invention, the steps of allowing the polymer to relax and stretching the polymer prior to heat-shrinking are not required. It is common for polymers to crack during stretching. Accordingly, the method disclosed herein may provide a less time consuming and more reliable method for manufacturing heat-shrinkable probe sleeves.

Spider die 50 can be designed to control the shrinkage during heat shrinking. For example, mandrel 56 may be attached to opening 52 by any number of spider legs 54. In some embodiments, there may only be a single spider leg 54 while in other embodiments, there may be 3, 4, 5, or more spider legs 54. As the number of spider legs 54 increases, the amount of shrinkage during heat-shrinking increases. However, as the number of spider legs increases the total residual internal stress in the extruded part may also increase if adequate relaxation time is not provided.

In embodiments of spider die 50 having more than one spider leg 54 it may be beneficial to locate spider legs 54 evenly around the circumference of opening 52. By evenly spacing spider legs 54 around the circumference of opening 52 the shrinking that occurs during subsequent heating may be evenly balanced around the shape of probe sleeve 30. By providing additional spider legs in strategic locations, it may be possible to obtain an equal amount of shrinking around the whole circumference of probe sleeve 30.

Furthermore, by adjusting the number of spider legs, it is possible to adjust the amount of shrinkage that will occur upon re-heating. Additional weld-lines generally lead to additional shrinking. In some embodiments, it may be beneficial to have more shrinkage in order to achieve a tight fit around probe housing 21. In other embodiments, only a minimal amount of shrinkage is required to achieve a tight fit and fewer spider legs are therefore needed.

Advantageously the wall thickness of probe sleeve 30 can be substantially constant. This facilitates manufacture of probe sleeve 30 by extrusion. In the illustrated embodiment the lack of sharp corners reduces the likelihood of stress cracking, especially when probe sleeve 30 has a constant or only slowly changing wall thickness.

Figure 11:
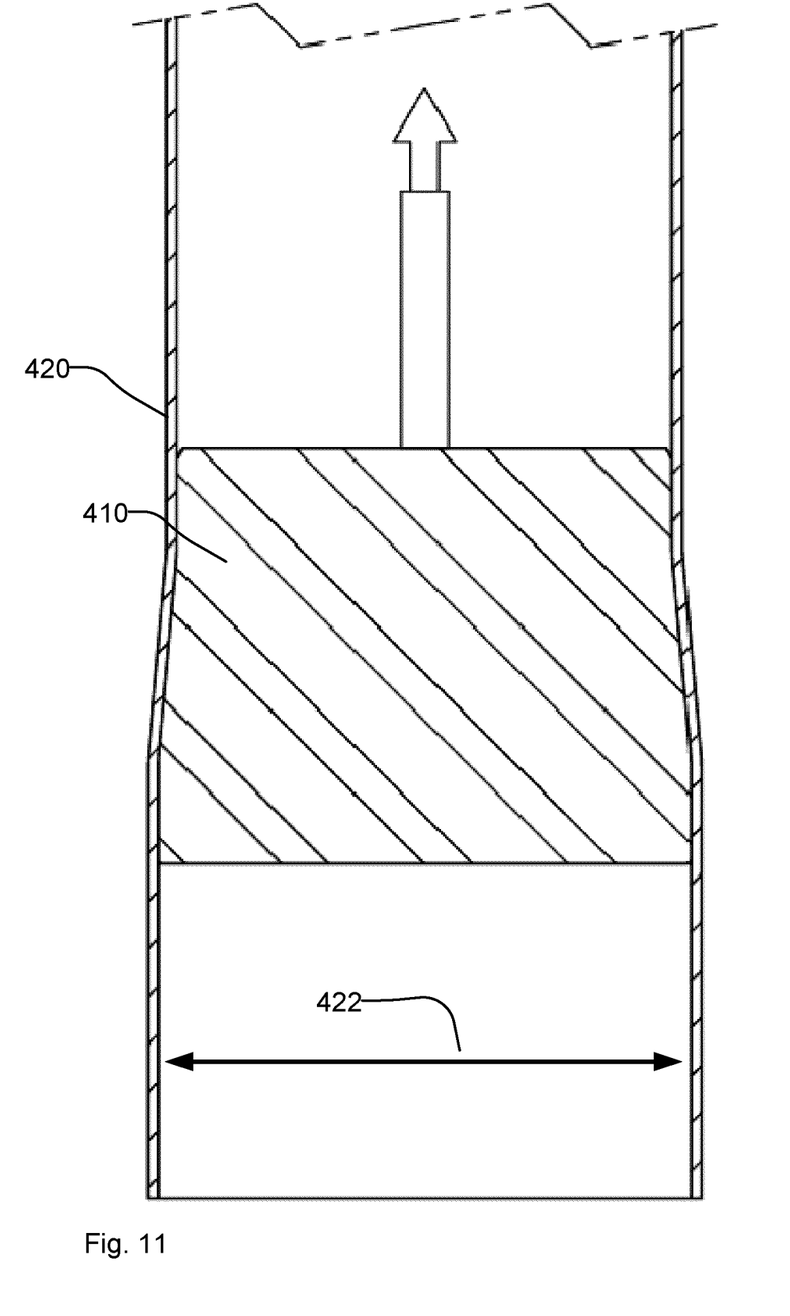
FIG. 11 is a schematic illustration showing a mandrel being pushed or pulled through a polymer sleeve.

In some embodiments, the above method is applied to a pre-constructed cylindrical polymer sleeve. The pre-constructed cylindrical polymer sleeve may be fabricated using any appropriate method and may comprise any of the materials discussed herein such as a thermoplastic or a glass fiber reinforced polymer. As depicted in FIG. 11, a mandrel 410 is pushed or pulled through pre-constructed polymer sleeve 420. The maximum external diameter 412 of mandrel 410 may be larger than the internal diameter 422 of pre-constructed cylindrical polymer sleeve 420. In this way, passing mandrel 410 through pre-constructed cylindrical polymer sleeve 420 may enlarge the internal diameter 422 of pre-constructed cylindrical polymer sleeve 420 and introduce internal stresses therein to thereby form a probe sleeve 30. In some embodiments, pre-constructed polymer sleeve 420 may be preheated to a temperature below its melting temperature before pushing or pulling mandrel 410 therethrough. However, it can be advantageous to expand polymer sleeve 420 at or near room temperature. At lower temperatures such as room temperature stresses imparted by a passage of mandrel 410 cannot equalize. Expanding polymer sleeve 420 at higher temperatures can cause relaxation and equalization of stresses (such that sleeve 420 may shrink less under subsequent application of heat).

In the same way discussed above, probe sleeve 30 (formed from a pre-constructed cylindrical polymer sleeve) may be placed over probe housing 21 and heat-shrunk to create a tight fit between probe sleeve 30 and probe housing 21. The tight fit may cause probe sleeve 30 to grip probe housing 21.

In a non-limiting example embodiment, a sleeve is provided for a probe having a cylindrical body of a given diameter by first extruding a suitable plastics material such as PPS through an extrusion die having 3 to 5 spiders evenly angularly spaced apart. The sleeve is then expanded by drawing a mandrel through the sleeve. The expanded sleeve has an inner diameter large enough to slide over the body of the probe. The expanded sleeve is then heat shrunk onto the probe as described above. In some embodiments the probe has a diameter in the range of 1½ to 3½ inches.

Another aspect of the invention provides a probe sleeve having reinforced weld-lines. Reinforcement may be applied after extrusion or during extrusion. In some embodiments, reinforcement comprises bonding additional material over top of the weld-lines as structural reinforcement. In other embodiments, reinforcement may be extruded along with a probe sleeve.

Reinforcements can be of any suitable shape. In some embodiments, reinforced sections may be round in cross section. In other embodiments, reinforced sections may be square or of another shape. It may be beneficial for reinforced sections to be rounded and not meet the outer perimeter of probe sleeve 30 at a sharp angle since sharp angles tend to create increased internal stresses in the polymer.

Probe sleeve 30 may have any number of reinforced sections. In some embodiments, the number of reinforced sections is set to match the number of weld-lines. In other embodiments, there may be fewer or more reinforced sections than there are weld-lines.

In some embodiments, protrusions 132 may have a secondary purpose of reinforcing weld-lines. In such embodiments, protrusions 132 can be located along weld-lines. In this way, the additional material of protrusions 132 may reinforce the potentially weakened region(s) of probe sleeve 130. In some embodiments, protrusions 132 are present in addition to reinforced sections.

Embodiments as described above may optionally provide one or more of the following advantages. Probe sleeve 30 may extend for the full length of the electronics package 22 or any desired part of that length. The cross-sectional area occupied by probe sleeve 30 can be relatively small, thereby allowing a greater area for the flow of fluid past electronics package 22 than would be provided by a thicker sleeve. Probe sleeve 30 can dissipate energy from shocks and vibration into the fluid within bore 27. Reducing local bending of electronics package 22 can facilitate longevity of mechanical and electrical components and reduce the possibility of catastrophic failure of the housing of electronics assembly 22 or components internal to electronics package 22 due to fatigue. Probe sleeve 30 can accommodate deviations in the sizing of electronics package 22 and/or the bore 27 of section 26. Probe sleeve 30 can accommodate slick electronics packages 22 and can allow an electronics package 22 to be removable (e.g. from centralizer 128, or from a drill collar) while downhole (since a probe sleeve 30 can be made so that it does not interfere with withdrawal of an electronics package 22 in a longitudinal direction). Probe sleeve 130 can prevent rotation of a centralizer so as to prevent premature wearing out of probe sleeve 130 and/or centralizer 28. Probe sleeve 30 can accommodate imperfections in the surface and shape of probe housing 21 without allowing fluid to flow between probe housing 21 and probe sleeve 30.

Apparatus as described herein may be applied in a wide range of subsurface drilling applications. For example, the apparatus may be applied to support downhole electronics that provide telemetry in logging while drilling ('LWD') and/or measuring while drilling ('MWD') telemetry applications. The described apparatus is not limited to use in these contexts, however.

While a number of exemplary aspects and embodiments are discussed herein, those of skill in the art will recognize certain modifications, permutations, additions and sub-combinations thereof. For example:

the probe sleeves herein can have any combination of one or more of the following features: protrusions for preventing rotation of a centralizer relative to the probe sleeve, reinforced weld-lines and/or be heat-shrinkable. For example, probe sleeves may be heat-shrinkable and have weld-lines reinforced using protrusions that also prevent rotation of a centralizer relative to the probe sleeve, probe sleeves may be heat shrinkable and have reinforced weld-lines as well as protrusions that prevent rotation of a centralizer relative to the probe sleeve, probe sleeves may not be heat-shrinkable and have reinforced weld-lines as well as protrusions that prevent rotation of a centralizer relative to the probe sleeve, etc.

It is therefore intended that the following appended claims and claims hereafter introduced are interpreted to include all such modifications, permutations, additions and sub-combinations.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification shall refer to this specification as a whole and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Various features are described herein as being present in "some embodiments". Such features are not mandatory and may not be present in all embodiments. Embodiments of the invention may include zero, any one or any combination of two or more of such features. This is limited only to the extent that certain ones of such features are compatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are incompatible).

Where a component (e.g. a circuit, module, assembly, device, drill string component, drill rig system etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A method for manufacturing a heat-shrinkable polymer probe sleeve for downhole drilling, the method comprising:
    extruding a molten polymer through a die to form a tube, the die comprising a spider die having two or more spider legs supporting a mandrel within an opening of the die; and
    cooling the tube to a temperature below a melting temperature of the polymer after said extrusion and before relaxation of the polymer reaches equilibrium;
    wherein the cooled tube is configured as a probe sleeve configured to shrink into contact with an outer surface of a downhole probe upon re-heating, wherein the probe sleeve comprises two or more spider-lines each corresponding to a respective one of the two or more spider legs of the spider die, and wherein a number and orientation of the two or more spider legs of the die are selected based at least on a desired mode of shrinking for the probe sleeve upon said re-heating.

2. The method of claim 1 wherein a length of time after said extrusion and before said cooling of the tube is less than the time required for the polymer to relax.

3. The method of claim 1 further comprising stretching the tube before relaxation of the polymer reaches equilibrium.

4. The method of claim 3 wherein stretching the tube induces an amount of stress that is less than a stress required to craze the polymer.

5. The method of claim 1 wherein the two or more spider legs are evenly spaced apart around the mandrel.

6. The method of claim 1 further comprising adding additional polymer to an external surface of the tube to reinforce the two or more spider-lines.

7. The method of claim 6 wherein the additional polymer forms a protrusion at each of the two or more spider-lines, each of the protrusions extending longitudinally along substantially an entire length of the external surface of the tube and being configured to engage radially inwardly extending projections of a downhole assembly centralizer.

8. The method of claim 6 wherein the additional polymer is added to the external surface of the tube as the polymer passes through the die.

9. The method of claim 1 wherein the polymer comprises polyphenylene sulfide.

10. The method of claim 1 wherein the tube is cylindrical.

11. A method of forming a downhole assembly, the method comprising inserting a downhole probe into a bore of the heat-shrinkable probe sleeve manufactured according to the method of claim 1 and subsequently heating the sleeve to shrink the sleeve into gripping contact with an outer surface of the downhole probe.

* * * * *